United States Patent [19]
Yasuda et al.

[11] 3,916,267
[45] Oct. 28, 1975

[54] SOLID CAPACITOR WITH ELECTROLYTE OF ORGANIC SEMICONDUCTOR AND POLYMER

[75] Inventors: Masahito Yasuda; Yoshimasa Ito; Susumu Yoshimura, all of Kawasaki, Japan

[73] Assignee: Matsushita Electric Industrial Company, Limited, Japan

[22] Filed: Nov. 4, 1974

[21] Appl. No.: 520,919

[30] Foreign Application Priority Data
Nov. 7, 1973 Japan.............................. 48-125637

[52] U.S. Cl................................. 317/230; 252/62.2
[51] Int. Cl.$^2$........................................... H01G 9/05
[58] Field of Search..................... 317/230; 252/62.2

[56] References Cited
UNITED STATES PATENTS
3,679,944  7/1972  Yoshimura et al. ................. 317/230

Primary Examiner—R. V. Rolinec
Assistant Examiner—Darwin R. Hostetter
Attorney, Agent, or Firm—Robert E. Burns; Emmanuel J. Lobato; Bruce L. Adams

[57] ABSTRACT

The electrolyte layer sandwiched between the anodic dielectric oxide film and the counter electrode is a dispersed phase of a complex salt of 7,7,8,8-tetracyano-quinodimethane in polyvinyl-butyral, wherein the amount of the polymer is from 2 to 30% by weight of the system.

4 Claims, 5 Drawing Figures

SOLID CAPACITOR WITH ELECTROLYTE OF ORGANIC SEMICONDUCTOR AND POLYMER

This invention relates to a solid electrolyte capacitor having an anodically formed dielectric oxide film and an electrolyte coating formed on the film, which coating is composed of a polymer and a salt of 7,7,8,8-tetracyanoquinodimethane.

A thin oxide film formed on an anodizable metal such as aluminum or tantalum, which is commonly called a valve metal, by anodic oxidation of the metal serves as a dielectric of a solid capacitor. As is well known in the art, such a film possesses essentially eminent dielectric characteristics, but in practice it cannot be devoid of considerable faults and micropores developed during and/or after anodization. As a result, dielectric characteristics and leakage current of a capacitor utilizing an anodically oxidized film always remain below the levels expected from the values inherent to an ideal oxide film. An electrolyte disposed between the dielectric oxide film and a counter electrode of a practical electrolyte capacitor, therefore, is required to have a function of electrolytically oxidizing the anode in the case of polarization thereof to reform the defective oxide film apart from its principal function as a substantial cathode.

Manganese dioxide has long been used as an excellent solid electrolyte to be coated on an anodic dielectric oxide film. There is, however, a significant problem in forming a manganess dioxide coating in intimate contact with the oxide film. Such a coating is usually formed by repeated cycles of applying a manganese nitrate solution on the oxide film and thermally decomposing the nitrate into the dioxide at considerably high temperatures, e.g., ranging from 200° to 400°C. The multiple exposure to the high temperature inevitably causes damage to the inherently weak dielectric oxide film and results in unsatisfactory characteristics of the produced capacitor. Accordingly, it is necessary to provide repeated steps of re-anodization between and after the heating steps. A capacitor produced by such complicated procedures has nevertheless shortcomings such as a relatively large leakage current and a relatively low working voltage.

Various organic semiconductive substances have been proposed to replace manganese dioxide so as to eliminate the above drawbacks. Examples of organic semiconductive substance promising as solid electrolyte materials for their good anodical oxidizing properties are some charge transfer complex compounds the acceptor of which is a nitro compound or a quinone compound. Another group of organic semiconductive compounds featuring superior anodizing capability is a group of salts having 7,7,8,8-tetracyanoquinodimethane, hereinafter referred to as TCNQ for brevity, as the anion component. Solid electrolyte capacitors based on these organic semiconductive compounds are described, e.g., in U.S. Pat. No. 3,586,923. These compounds can be coated on an anodic oxide film without requiring high temperatures and hence scarcely causing damage to the oxide film. Furthermore, they exhibit better anodizing or reforming properties than manganese dioxide.

Theoretically, these organic semiconductive compounds serve as advantageous electrolytes for solid electrolyte capacitors, but improved capacitors of practical use can be obtained only when a practical method of coating such a compound on the dielectric oxide film is established. The method is required to give a dense, uniform and strongly adhering coating without damaging the inherent property of the compound or its ability to reform an anodic oxide film.

At first, application of an organic solvent solution of a TCNQ salt was proposed, e.g., in U.S. Pat. Nos. 3,214,648 and 3,214,650. Although the method is quite easy to carry out, such a method usually fails in giving the desired degree of denseness and adhesion strength of the resulting coating. Next, a semiconductive polymer or a polymer capable of dissolving a semiconductive salt has been sought for, and U.S. Pat. 3,424,698 and 3,483,438 respectively disclose some polymers which dissolve TCNQ and its salts and electrolyte capacitors based on such polymers. A problem with respect to the polymers according to these patents resides in that relatively large amounts of the polymer are required to obtain an electrolyte coating of such denseness and adhesion as to ensure the desired level of stability and durability of the resulting capacitor. In the capacitors of U.S. Pat. No. 3,483,438, for example, a polymer content of more than 50% by weight is necessary to prepare an electrolyte system in which a TCNQ salt is dissolved to saturation.

The amount of a polymer or binder in an electrolyte system is smaller the better for obtaining a capacitor of excellent characteristics because the capacitor characteristics are substantially determined by the physical properties of the polymer itself when a large amount of polymer is used. Practical disadvantages resulting from a large polymer content in an electrolyte layer of a solid capacitor are as follows:

1. increase in the specific resistance of the electrolyte and hence increase in the dielectric loss of the capacitor;
2. decrease in the capacitance of the capacitor;
3. deterioration of the capacitor characteristics due to expansion of the polymer.

It is an object of the present invention to provide a solid electrolyte capacitor, whose electrolyte layer is composed of a major amount of an organic semiconductor and a minor amount of a polymer, but strongly adheres to the anodic dielectric oxide film.

It is another object of the invention to provide a solid electrolyte capacitor which operates stably over a wide temperature range and has an excellent durability.

A solid electrolyte capacitor of the invention is of a known construction and has a dielectric oxide film formed on a first electrode of an anodically oxidizable metal, a second electrode and a solid electrolyte layer formed between and in intimate contact with both electrodes. According to the invention, the electrolyte layer is composed of 70 to 98% by weight of a semiconductive complex salt of TCNQ and 2 to 30% by weight of polyvinylbutyral. The degree of polymerization and the degree of butyration of the polyvinyl-butyral range preferably from about 200 to about 2000, and from about 60 to 80%, respectively.

Other features and advantages of the invention will become apparent from the following detailed description with reference to the accompanying drawings, in which.

Figure 1:
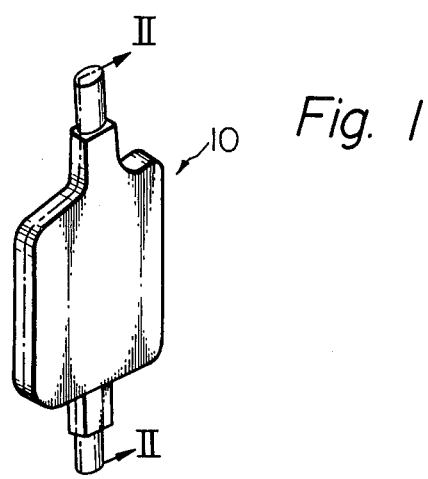
FIG. 1 is a perspective view of a solid electrolyte capacitor according to the invention.
Figure 2:
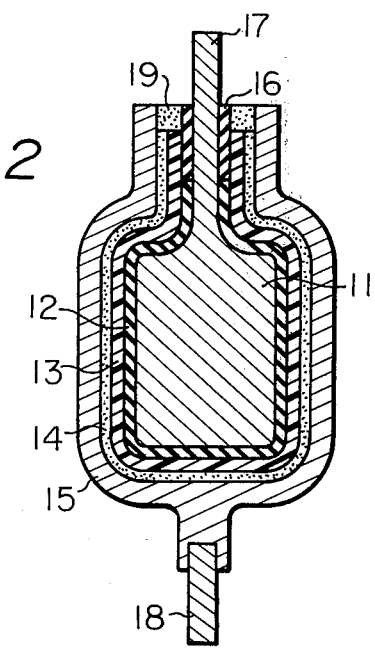
FIG. 2 is a vertical section taken along line II—II of FIG. 1.

A solid electrolyte capacitor 10 according to the invention shown in FIGS. 1 and 2 by way of example is fundamentally of a similar construction to the prior art capacitor utilizing an organic solid electrolyte. An anode 11 is a foil of a valve metal such as aluminum or tantalum and has a thin and dense dielectric film 12 formed thereon by anodic oxidation. The surface of the anode 11 may be etched before anodization to obtain a good quality of dielectric oxide film 12 as is well known in the art. The entire surface of the oxide film 12 is covered with a coating 13 of the organic solid electrolyte, which will be described hereinafter in more detail. The coating 13 is electrically in contact with and physically fixed to a metal case 15 having an integral cathode lead 18 by means of a conventional conductive and adhesive material 14 such as a silver paste or colloidal graphite. An anode lead 17 is connected to the anode 11 and partly coated with an insulator 16 such as an epoxy resin so as to be isolated from the electrolyte coating 13. A space between the case 15 and the lead 17 is filled with an insulating adhesive 19.

A wide variety of TCNQ-containing electron-donor-acceptor compounds are known. Some of them such as, e.g., $NH_4^+TCNQ^-$ and $Ba^{2+}(TCNQ)_2^-$ have nearly perfect ionic bonds and are commonly called simple salts of TCNQ. Another group of them have a different structure in that each of their molecules contains at least one molecule of neutral or nonionized TCNQ, e.g., $(triethylammonium)^+TCNQ^-\cdot TCNQ$, $(quinolinium)^+TCNQ^-\cdot TCNQ$, and $(pyridinium)^+TCNQ^-\cdot TCNQ$. These are called complex salts of TCNQ and exhibit particularly high conductivities not only electronically but also ionically.

The solid electrolyte coating according to the invention contains a semiconductive TCNQ salt. The TCNQ salt may be either a single salt or a complex salt, but the latter is preferred for its high conductivity and excellent action on the anodic oxidation. The complex salts of TCNQ with an alkyl derivative of quinoline or pyridine are examples of preferred salts in addition to the above described three salts.

In accordance with the invention, the electrolyte coating 13 is a dispersion of such a complex salt of TCNQ in a solid film of polyvinyl-butyral. In general, polyvinyl-butyral exhibits an excellent adhesing property to metals and glass, and forms a film which is very tough, shock-resistant, environment-resistant and stable over a wide temperature range. We have contemplated these features of polyvinyl-butyral and ascertained that it serves as an excellent binder for dispersing the TCNQ salt therein. The amount of polyvinyl-butyral in the electrolyte coating 13 can be reduced compared with conventional polymer binders because of its stronger adhesion on the dielectric oxide film 12. It is another advantage of polyvinyl-butyral over some nitrogen-containing polymers capable of dissolving TCNQ salts that the former is less reactive with the TCNQ salts and hence gives the electrolyte coating of improved stability.

A solid film of polyvinyl-butyral is slightly hygroscopic and absorbs from 5 to 8% of water when immersed in water for a long period of time, but the absorbed water is expelled by drying without affecting the physical and chemical properties of the film. The film does not tend to be turned brittle or peeled from the substrate even if such water absorption and drying are repeated many times.

As is known, polyvinyl-butyral is usually obtained by the condensation of polyvinyl alcohol with butyraldehyde. Polyvinyl alcohol is usually produced by the saponification of polyvinyl acetate. In practice, it is difficult to accomplish a complete butyration of the alcohol groups of polyvinyl alcohol even if an ideal polyvinyl alcohol is used. Besides, the hydrolysis of polyvinyl acetate usually remains incomplete. Consequently, an industrial product of polyvinyl-butyral is regarded as a copolymer of polyvinyl-butyral (from about 60 to about 80 mole %), polyvinyl alcohol (from about 20 to about 40 mole %) and polyvinyl acetate.

The properties of polyvinyl-butyral are dependent on both the respective proportions of butyral, acetyl and hydroxyl groups and on the degree of polymerization. In general, polyvinyl-butyral becomes more soluble in various solvents and less hygroscopic as the amounts of butyral and acetyl groups increase. At the same time, the softening temperature of the polymer shows a slight fall. The degree of polymerization, however, has generally more influences on the physical properties of polyvinyl-butyral. The degree of polymerization of this polymer is usually represented by that of the starting polyvinyl alcohol and usually lies in the range between about 200 and about 2000. As to the adhesion of this polymer to any other material, stronger adhesion can generally be attained as the degree of polymerization is reduced. Furthermore, polyvinyl-butyral for use as an adhesive has preferably a certain extent of distribution in its degree of polymerization than a uniform value. The adhesion strength increases as the amount of acetyl groups increases under a determined extent of butyration.

For the electrolyte coating 13 according to the invention, the degree of polymerization and the extent of butyration of polyvinyl-butyral lie preferably in the ranges between about 200 and 2000, and between about 60 and about 80%, respectively.

It is, however, the most important matter for forming the electrolyte coating 13 of the invention that the amount of polyvinyl-butyral in the solid electrolyte system is regulated within the range between 2 and 30% by weight of the system. If the polymer content is less than 2%, the coating 13 does not exhibit the properties characteristic of a solid polymer film, but a quite poor adhesion to the oxide film 12 and the cathods 14. Besides, the capacitor 10 can have only relatively small values of capacitance with relatively large loss values. When the amount of polyvinyl-butyral is increased beyond an optimum value, which is usually near 10%, the capacitor 10 shows a gradual decrease in its capacitance and a gradual increase in the loss. From the practical viewpoint, the upper limit of the polyvinyl-butyral content in the electrolyte coating 13 is considered 30% by weight. However, best results can be obtained when the polymer content is limited to 20% at most.

In the preparation of the electrolyte coating 13 of the invention, one of the complex salts of TCNQ described hereinbefore and polyvinyl-butyral are dissolved in an organic solvent which dissolves the both substances. The oxide film 12 is coated with this solution by any of the usual coating methods and then dried at about 100°C to evaporate the solvent.

The following examples are presented to further illustrate the invention.

EXAMPLE 1

The complex salt of TCNQ with quinoline, (quinolinium)$^+$TCNQ$^-$.TCNQ, was used as the organic semiconductor, and polyvinyl-butyral was of the degree of polymerization ranging from about 300 to about 400 and butyralled to the extent of about 60%. The quantity of the polyvinyl-butyral to mix with 200g of the TCNQ salt was varied from 2 to 180g to examine the effects of the polymer content in the electrolyte coating 13 on the characteristics of the capacitor 10. The TCNQ salt and polyvinyl-butyral were dissolved in 25l of a mixture of acetonitrile and ethyl alcohol. The aluminum anode 11 was initially etched to increase its surface area and then anodized to form the dielectric oxide film 12 thereon in the well known manners. The oxide film 12 was then coated with the above solution followed by drying at about 100°C. The thus formed solid electrolyte coating 13 on the oxide film 12 was assembled into the solid capacitor 10 generally as shown in FIG. 2.

Figure 3:
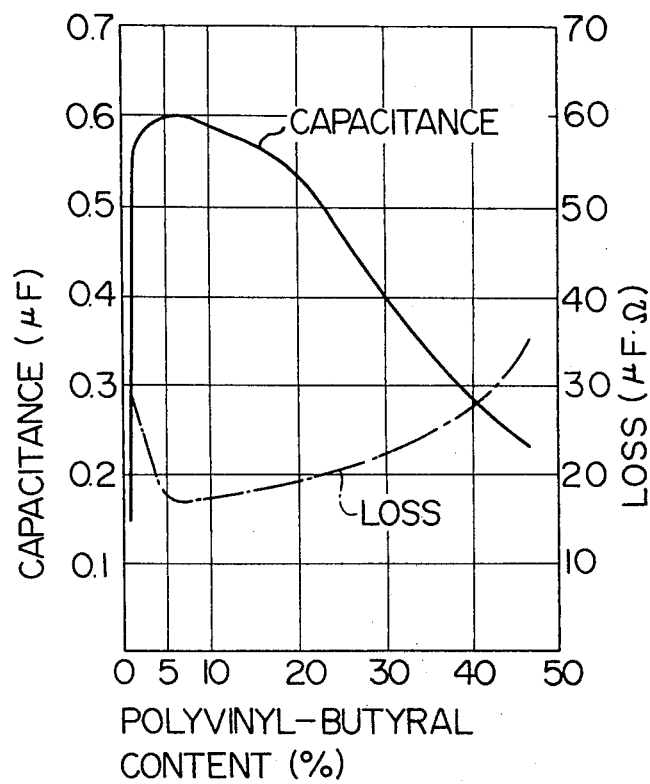
FIG. 3 is a graph showing the variations in the capacitance and dielectric loss of capacitors according to the invention with respect to the polyvinyl butyral content in the electrolyte layers thereof.

The thus produced multiplicity of capacitors 10, each differing in the amount of polyvinyl-butyral in the coating 13, were subjected to measurements of the capacitance and the dielectric loss. The results are graphically presented in FIG. 3. As seen in the graph, a maximum capacitance with a minimum loss was observed at the polyvinyl-butyral content in the electrolyte coating 13 of about 8% by weight. The capacitance was sufficiently large, but the loss value was small enough to suffice for the practical requirements when the amount of polyvinyl-butyral in the coating 13 was in the range between 2 and 30%.

In the following examples, the formation of the dielectric oxide film 12 and the assembly of the capacitor 10 were identical with those in Example 1.

EXAMPLE 2

Two types of polyvinyl-butyral were used. They were of the same extent of butyration of about 60%, but different in the degree of polymerization, one (A) in the range between about 300 and about 400, and the other (B) about 1700. The solution for the electrolyte coating was prepared by dissolving 10g of either the polyvinyl butyral (A) or (B) and 200g of (quinolinium)$^+$TCNQ$^-$·TCNQ in 25l of a mixture of acetonitrile and ethyl alcohol. The solution was applied on the oxide film 12 and dried at about 100°C.

The characteristics of the resulting solid capacitors 10 were as shown in the following Table 1.

Table 1

| Polyvinyl butyral | Capacitance (μF) | Loss (MF.Ω) | Leakage Current (μA) |
|---|---|---|---|
| (A) | 0.60 | 18 | 0.02 |
| (B) | 0.48 | 21 | 0.01 |

EXAMPLE 3

In this example, the polyvinyl-butyral (A) of Example 2 was compared with another type of polyvinyl-butyral (C), which had the same degree of polymerization as (A), but was butyralled to the extent of about 80%. 10g of each polyvinyl butyral was dissolved in 25l of the solvent of Example 2 together with 200g of the TCNQ salt of Example 2. Example 2 was repeated thereafter, and the results are presented in Table 2.

Table 2

| Polyvinyl butyral | Capacitance (μF) | Loss (μF.Ω) | Leakage Current (μA) |
|---|---|---|---|
| (A) | 0.58 | 19 | 0.01 |
| (C) | 0.50 | 20 | 0.02 |

EXAMPLE 4

(Propylquinolinium)$^+$TCNQ$^-$·TCNQ was used as the complex salt of TCNQ. 400g of this TCNQ salt and 20g of the polyvinyl-butyral (A) of Example 2 were dissolved in 25l of a mixture of acetone and ethyl alcohol. The resulting capacitor 10 had the following characteristics: capacitance, 0.36μF; loss, 32μF.Ω; leakage current, 0.01μA.

EXAMPLE 5

Figure 4:
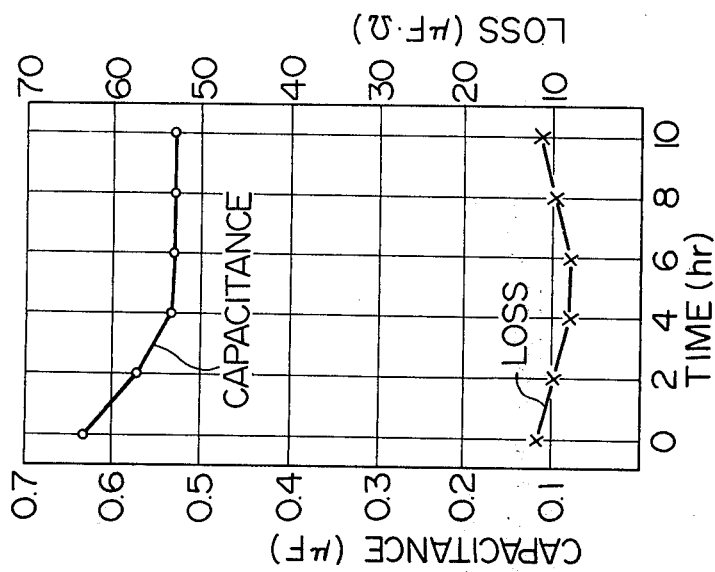
FIG. 4 is a graph showing the variations in the capacitance and dielectric loss of a capacitor according to the invention when the capacitor is subjected to a heat test.

Several capacitors 10 were produced in accordance with Example 2 by the use of the polyvinyl-butyral (A) and subjected to a heat test. The capacitors were maintained at 150°C under no load. Both the capacitance and the loss value showed only slight changes during the test period of 10 hr as shown in the graph of FIG. 4.

EXAMPLE 6

Figure 5:
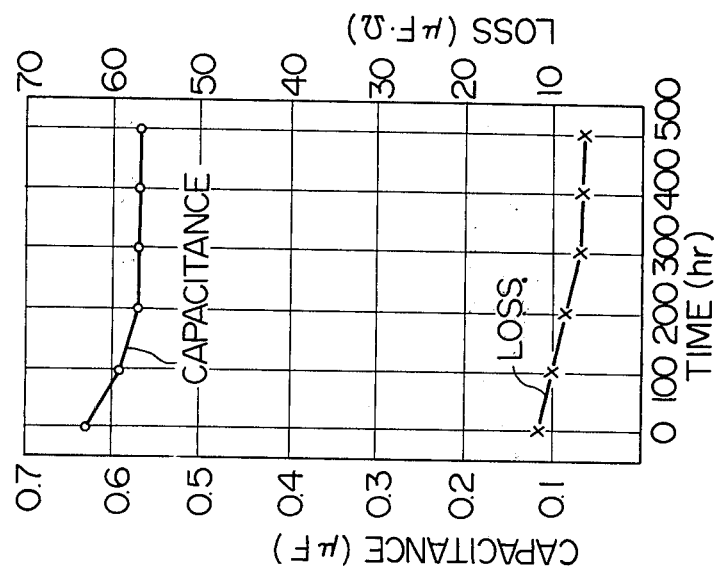
FIG. 5 is a similar graph, but showing the variations when the capacitor is subjected to a life test.

A life test was carried out with the capacitors 10 produced in the same manner as in Example 5. The capacitors were maintained at 85°C under the load of 25V D.C. Both the capacitance and the loss value of the capacitors varied very slightly with the elapse of time up to 500 hr as shown in the graph of FIG. 5.

As seen from these experimental results, a solid electrolyte capacitor according to the invention features not only its relatively large capacitance with a relatively small magnitude of dielectric loss but also a strong resistance to high temperatures as well as a prolonged life. Also it will be apparent that the electrolyte according to the invention can employ practically any of the TCNQ salts, other than the two salts employed in the Examples, which are known to serve as a solid electrolyte, because polyvinyl-butyral does not chemically affect those TCNQ salts.

What is claimed is:

1. In a solid electrolyte capacitor having a dielectric oxide film formed on a first electrode of an anodically oxidizable metal, a second electrode and a solid electrolyte layer formed between and in intimate contact with both electrodes, the solid electrolyte essentially consisting of a polymer containing a semiconductive salt of 7,7,8,8-tetracyanoquinodimethane (TCNQ) dispersed therein, the improvement comprising the polymer being polyvinyl-butyral and amounting to 2 to 30% by weight of said solid electrolyte.

2. The improvement according to claim 1, wherein the degree of polymerization of said polyvinyl-butyral substantially ranges from 200 to 2000.

3. The improvement according to claim 1, wherein the extent of butyration of said polyvinyl-butyral substantially ranges from 60 to 80%.

4. The improvement according to claim 1, wherein said semiconductive salt of TCNQ is a complex salt of TCNQ selected from the group consisting of (quinolinium)$^+$TCNQ$^-$·TCNQ and (propylquinolinium)$^+$TCNQ$^-$·TCNQ.

* * * * *